United States Patent [19]
Ueki

[11] Patent Number: 6,018,990
[45] Date of Patent: Feb. 1, 2000

[54] FLATNESS MEASURING AND ANALYZING METHOD

[75] Inventor: Nobuaki Ueki, Omiya, Japan

[73] Assignee: Fuji Photo Optical Co., Ltd., Saitama, Japan

[21] Appl. No.: 09/030,934

[22] Filed: Feb. 26, 1998

[30] Foreign Application Priority Data

Mar. 28, 1997 [JP] Japan .................................... 9-095211
Feb. 23, 1998 [JP] Japan .................................. 10-057461

[51] Int. Cl.$^7$ .................................................. B23Q 17/09
[52] U.S. Cl. ................................ 73/104; 73/159; 356/357
[58] Field of Search ............................... 73/78, 159, 160, 73/800, 104; 356/357, 358, 359

[56] References Cited

U.S. PATENT DOCUMENTS

| | | | |
|---|---|---|---|
| 3,703,097 | 11/1972 | Kilpatrich et al. .......................... | 73/159 |
| 5,153,844 | 10/1992 | Beni et al. ................................. | 702/167 |
| 5,220,403 | 6/1993 | Batchelder et al. ...................... | 356/345 |
| 5,502,566 | 3/1996 | Ai et al. .................................... | 356/359 |
| 5,739,906 | 4/1998 | Evans et al. .............................. | 356/357 |

*Primary Examiner*—Max Noori
*Attorney, Agent, or Firm*—Snider & Associates; Ronald R. Snider

[57] ABSTRACT

While the three-flat method is used as background art, a technique for analyzing the difference between two planes by approximating it with symmetry power series polynomials are employed, and measurement is effected at two positions where the reference surface and the sample surface are in a predetermined reference rotation state and where they are rotated from each other by 90 degrees from the former state; whereby the approximate surface form of the whole plane can be determined by a very simple arithmetic operation with a high accuracy. Of three glass sheets, different pairs of two glass sheets 53 and 54 are successively selected three times. The difference between two surfaces to be measured in each pair of the two glass sheets 53 and 54 is measured at a first position where, with respect to one glass sheet 53, the other is set at a predetermined rotational position; and a second position where the two sheets are rotated from each other by 90 degrees from the first position. Then prepared are relational expressions to which sixth-order Zernike polynomials approximating the difference between the surfaces to be measured is applied. These relational expressions are operated so as to determine the form of the surface to be measured in each of the glass sheets.

4 Claims, 11 Drawing Sheets

0.01 WAVE (A)

0.01 WAVE (B)

0.05 WAVE (C)

0.07 WAVE (A+D)

0.06 WAVE (B+D)

0.06 WAVE (C+D)

0.06 WAVE (D)

0.06 WAVE (D')

0.06 WAVE (D'')

EXAMPLE OF FORM SEPARATING METHOD FOR (4) IN ZERNIKE POLYNOMIALS $D_4 = C_4 + A_{4\_0°}$  SAMPLE ROTATIONAL ANGLE : 0°

EXAMPLE OF FORM SEPARATING METHOD FOR (4) IN ZERNIKE POLYNOMIALS

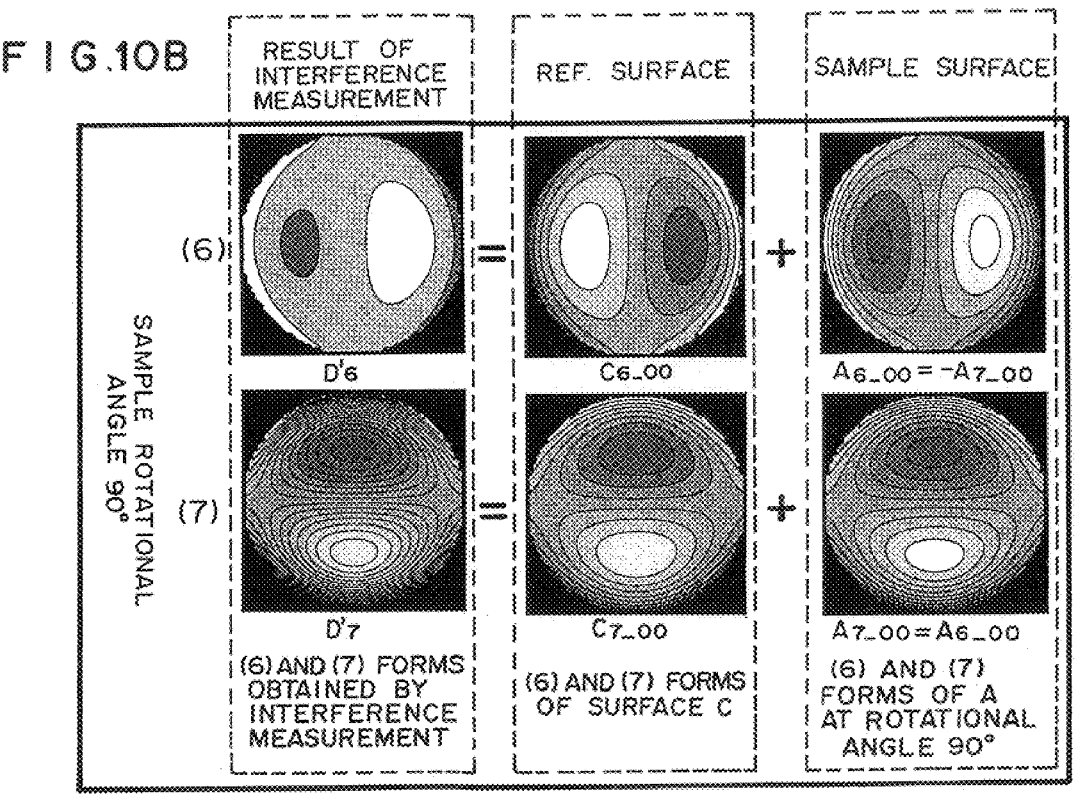

FLATNESS MEASURING AND ANALYZING METHOD

RELATED APPLICATIONS

This application claims the priority of Japanese Patent Application No. 9-95211 (Title: Flatness measuring and analyzing method) filed on Mar. 28, 1997 and Japanese Patent Application (Title: Flatness measuring and analyzing method) filed on Feb. 23, 1998, which are incorporated herein by reference.

BACKGROUND OF THE INVENTION

1. Field of the Invention

The present invention relates to a flatness measuring and analyzing method and, in particular, to a flatness measuring and analyzing method in which a surface form of a plane used as a reference surface of an interferometer or the like is determined by so-called the three-flat method.

2. Description of the Prior Art

Known as a technique for measuring a flatness of an object surface is measurement by an interferometer such as Fizeau interferometer. Though such an interferometer can measure flatness of a sample surface with a high accuracy, this measurement is not absolute measurement but relative measurement with respect to a reference surface. Accordingly, a plane with a very high accuracy is necessary as its reference surface, thereby requiring a method of measuring a reference surface having such a plane of high accuracy.

Known as a technique for measuring such a reference surface is so-called the three-flat method comprising the steps of preparing three sheets of reference plates, measuring the difference between two reference surfaces in each combination of three pairs of reference plates selected from these three plates, and solving simultaneous equations according to the results of measurement, thereby measuring the form of each reference surface.

In the following, this three-flat method will be explained.

Three sheets of reference sheet glass are referred to as A, B, and C. When a coordinate system shown in FIG. 1 is set for each reference glass sheet, forms of the glass surfaces of A, B, and C can be expressed by functions of x and y, whereby they are defined as A (x, y), B (x, y), and C (x, y). Z coordinate shown in FIG. 1 is set in order to specify a glass surface as plus and minus respectively when it is convex and concave.

Here, for example, a reference surface and a sample surface are respectively assumed to be A(x, y) and B(x, y), and these two surfaces are opposed to each other as shown in FIG. 8A so as to be set at a predetermined position of a Fizeau interferometer.

Assuming that the difference between both surfaces measured by this interferometer is $\phi_{AB}(x, y)$, $$\phi_{AB}(x, y) = A(x, y) + B(x', y').$$

When the coordinates of the sample surface are expressed by the coordinates of the reference surface, $B(x', y')$ is replaced by $B(x, -y)$, thereby $$\phi_{AB}(x, y) = A(x, y) + B(x, -y).$$

Similarly, with respect to other combinations such as those shown in FIGS. 8(b) and 8(c), $$\phi_{CA}(x, y) = C(x, y) + A(x, -y)$$

$$\phi_{BC}(x, y) = B(x, y) + C(x, -y).$$

With respect to a line of y=0, $$\phi_{AB}(x, 0) = A(x, 0) + B(x, 0)$$

$$\phi_{CA}(x, 0) = C(x, 0) + A(x, 0)$$

$$\phi_{BC}(x, 0) = B(x, 0) + C(x, 0).$$

Since $\phi_A B(x, 0)$, $\phi_C A(x, 0)$, and $\phi_B C(x, 0)$ are determined by actual measurement, each form of A(x, y), B(x, y), and C(x, y) is determined when simultaneous equations concerning these three relational expressions are solved.

However, the form determined by the foregoing technique is not a surface form but a cross-sectional form of one line. When the reference surface is rotationally symmetrical, the whole surface form can be recognized by determining a cross-sectional form of one line. Nevertheless, since the reference surface is not rotationally symmetrical in general, a technique for specifying the whole surface form with a high accuracy is needed.

Therefore, the inventors have proposed a method comprising the steps of repeating measurement while relatively rotating the reference surface and the sample surface little by little, simulatively constructing a rotationally symmetrical form by averaging the resulting data, and executing the above-mentioned the three-flat method.

Nevertheless, when such a method is used, the number of measuring operations increases, whereby each operation of measurement and analysis becomes complicated, and errors in measurement may be accumulated.

SUMMARY OF THE INVENTION

In view of the foregoing circumstances, it is an object of the present invention to provide a flatness measuring and analyzing method, capable of specifying the surface form of the whole plane, which is simple and can reduce errors in measurement.

The flatness measuring and analyzing method in accordance with the present invention is a method in which, of predetermined three sheets of plates, different pairs of two sheets are successively selected three times, thus selected each pair of plates are disposed so as to oppose each other with a predetermined gap therebetween upon each selecting operation, the difference between thus opposed surfaces to be measured is two-dimensionally measured, and a form of the surface to be measured of each of the plates is determined by operating results of the three sets of measurement, the method comprising the steps of:

measuring the difference of the pair of surfaces to be measured at a first position where, with respect to one plate, the other plate is set at a predetermined rotational position and a second position where the two plates are rotated from each other by 90° from the first position;

subsequently preparing a relational expression correlating results of measurement of the difference between the pair of surfaces at the first and second positions with predetermined symmetry power series polynomials approximating a form of the surface of the plate to be measured; and then determining the form of the surface to be measured in each of the plates by operating the relational expressions prepared for the respective surfaces to be measured in each of the pairs with each other.

Here, the symmetry power series polynomials include a rotationally symmetrical term and a nonrotationally symmetrical term. As the nonrotationally symmetrical term, it may include a term in which, when a coordinate axis is rotated by 90 degrees, only a sign of a coefficient is reversed with respect to the expression before rotation; or a term in which, when the coordinate axis is rotated by 90 degrees, of two nonrotationally symmetrical terms which form a pair, the expression before rotation of one term and the expression after rotation of the other term exchange their coefficients or reverse signs of their coefficients. In this specification, "symmetry power series polynomials" refer to polynomials defined here.

Preferably, the symmetry power series polynomials comprise a rotationally symmetrical term and a nonrotationally symmetrical term; whereas the nonrotationally symmetrical term consists of a term in which, when a coordinate axis is rotated by 90 degrees, only a sign of a coefficient is reversed with respect to the expression before rotation, and a term in which, when the coordinate axis is rotated by 90 degrees, of two nonrotationally symmetrical terms which form a pair, the expression before rotation of one term and the expression after rotation of the other term exchange their coefficients or reverse signs of their coefficients.

Specifically, the predetermined power series polynomials are sixth-order Zernike polynomials, for example.

As an apparatus for two-dimensionally measuring the difference between the pair of surfaces, a Fizeau interferometer is used, for example.

BRIEF DESCRIPTION OF THE DRAWINGS

FIGS. 10A and 10B are schematic view showing an operation technique in the case where p=6 and p=7 in the present example.

DESCRIPTION OF THE PREFERRED EMBODIMENTS

In the following, a flatness measuring and analyzing method in accordance with an embodiment of the present invention will be explained in detail.

Figure 1:
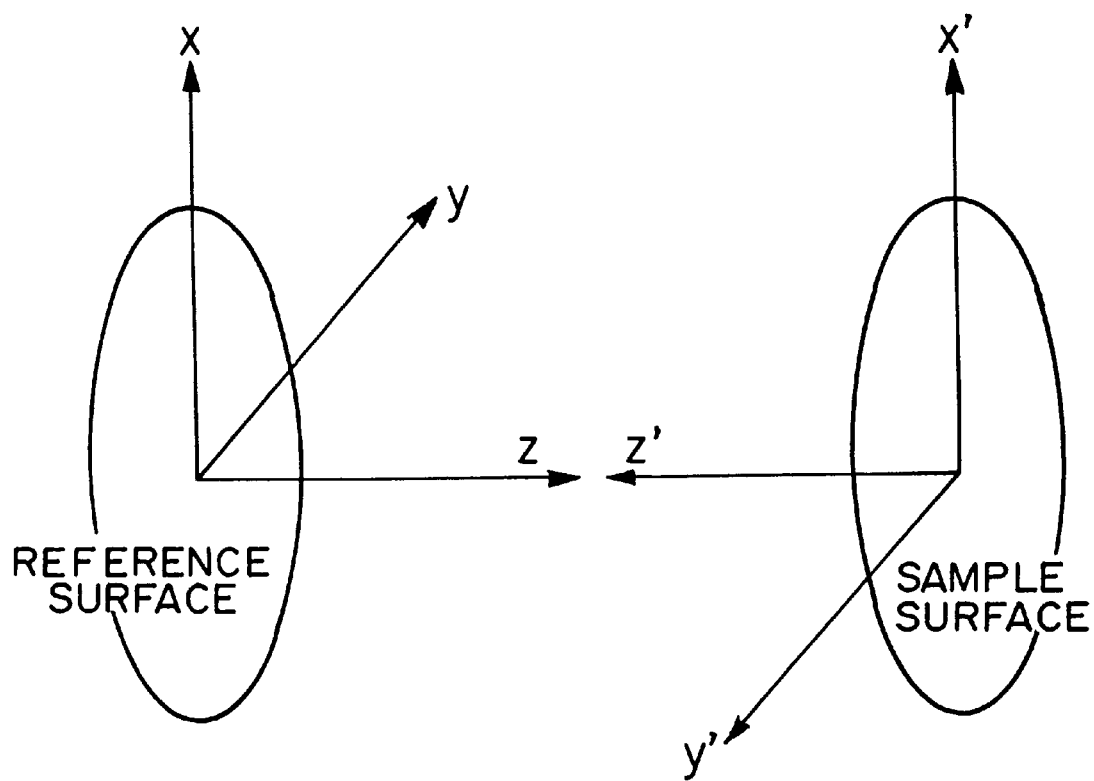
FIG. 1 is a view for explaining a method in accordance with an example of the present invention.

First, as in the case of the above-mentioned prior art, three sheets of reference sheet glass for a Fizeau interferometer are prepared and defined as A, B, and C. To each of these reference glass sheets, a coordinate system such as that shown in FIG. 1 is applied, and their respective reference surfaces are expressed as A(x, y), B(x, y), and C(x, y).

Figure 7:
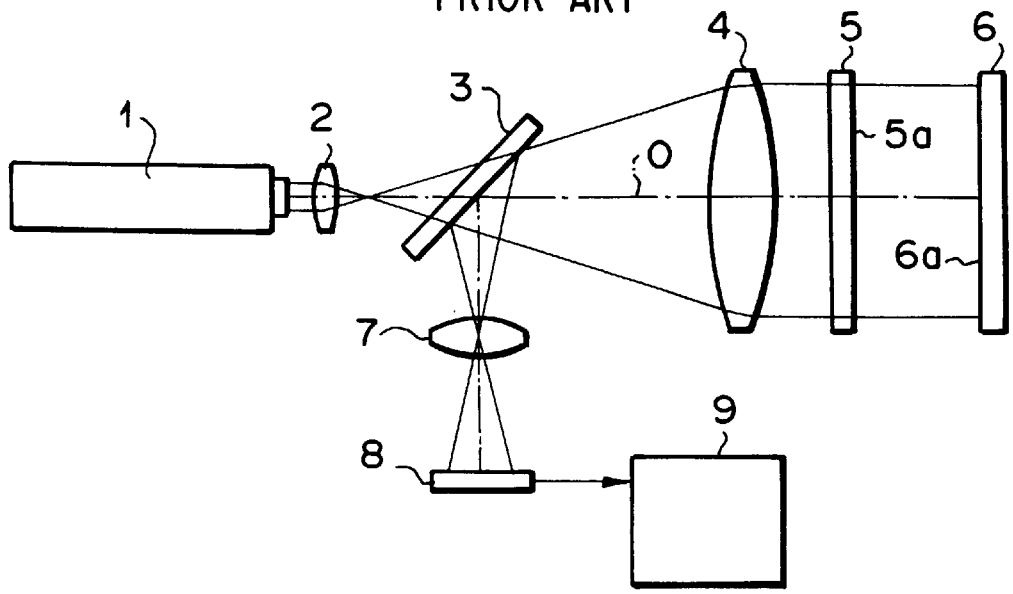
FIG. 7 is a schematic view showing a typical configuration of a Fizeau interferometer which has been conventionally used.
Figure 8A:
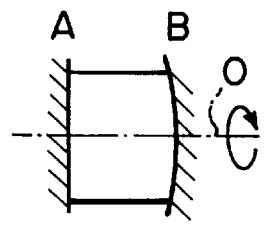
FIGS. 8A to 8C are schematic views for explaining a conventional the three-flat method.
Figure 8B:
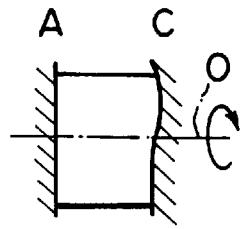
Figure 8C:
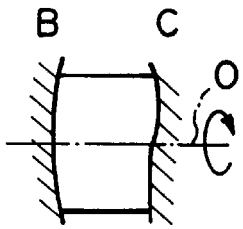

Here, a Fizeau interferometer such as that shown in FIG. 7 is prepared, and A and B are respectively set to positions of a reference plate 5 and a sample plate 6. A reference surface 5a and a surface form of a sample surface 6a are respectively set to A(x, y) and B(x, −y), and then the difference between both surfaces measured by this interferometer is defined as $\phi_{A\ B}(x, y)$.

Similarly, when the reference surface 5a and the sample surface 6a are respectively set to C(x, y) and A(x, −y), the difference between both surfaces is defined as $\phi_{C\ A}(x, y)$; whereas, when the reference surface 5a and the sample surface 6a are respectively set to B(x, y) and C(x, −y), the difference between both surfaces is defined as $\phi_{B\ C}(x, y)$.

Then, surface forms of these reference surfaces are represented as being approximated by sixth-order Zernike polynomials. These polynomials, which are often used for analyzing aberrations, can express, by method of least squares, with a function of x and y, a form approximating the one measured by an interferometer. Here, the sixth order of Zernike polynomials are used.

The following Table 1 specifically shows each term of the Zernike polynomials to sixth order.

TABLE 1

| p | Zernike polynomials $Z_p(x,y)$ | |
|---|---|---|
| 0 | 1 | |
| 1 | x | |
| 2 | y | |
| 3 | $2(x^2 + y^2) - 1$ | rotationally symmetrical |
| 4 | $x^2 - y^2$ | nonrotationally symmetrical |
| 5 | $2xy$ | nonrotationally symmetrical |
| 6 | $3(x^3 + xy^2) - 2x$ | nonrotationally symmetrical |
| 7 | $3(x^2y + y^3) - 2y$ | nonrotationally symmetrical |
| 8 | $6(x^4 + 2x^2y^2 + y^4 - x^2 - y^2) + 1$ | rotationally symmetrical |
| 9 | $x^3 - 3xy^2$ | nonrotationally symmetrical |
| 10 | $3x^2y - y^3$ | nonrotationally symmetrical |
| 11 | $4(x^4 - y^4) - 3(x^2 - y^2)$ | nonrotationally symmetrical |
| 12 | $8(x^3y + xy^3) - 6xy$ | nonrotationally symmetrical |
| 13 | $10(x^5 + 2x^3y^2 + xy^4) - 12(x^3 + xy^2) + 3x$ | nonrotationally symmetrical |
| 14 | $10(x^4y + 2x^2y^3 + y^5) - 12(x^2y + y^3) + 3y$ | nonrotationally symmetrical |
| 15 | $20(x^6 + 3x^4y^2 + 3x^2y^4 + y^6) - 30(x^4 + 2x^2y^2 + y^4) + 12(x^2 + y^2) - 1$ | rotationally symmetrical |

The forms approximating those of A(x, y), B(x, y), and C(x, y) in these sixth-order Zernike polynomials are:

Expression 1

$$A(x, y) \approx \sum_{p=0}^{15} A_p Z_p(x, y) \quad (1)$$

$$B(x, y) \approx \sum_{p=0}^{15} B_p Z_p(x, y) \quad (2)$$

$$C(x, y) \approx \sum_{p=0}^{15} C_p Z_p(x, y) \quad (3)$$

wherein $A_p$, $B_p$, and $C_p$ indicate coefficients upon approximation in expressions (1) to (3).

Then, the forms measured by the interferometer are represented by approximate expressions as follows:

Expression 2

$$\phi_{AB}(x, y) \approx \sum_{p=0}^{15} A_p Z_p(x, y) + \sum_{p=0}^{15} B_p Z_p(-x, y) \quad (4)$$

$$\phi_{CA}(x, y) \approx \sum_{p=0}^{15} C_p Z_p(x, y) + \sum_{p=0}^{15} A_p Z_p(-x, y) \quad (5)$$

$$\phi_{BC}(x, y) \approx \sum_{p=0}^{15} B_p Z_p(x, y) + \sum_{p=0}^{15} C_p Z_p(-x, y) \quad (6)$$

Here, in the Zernike polynomials, p=0 which simply raises the plane, p=1 which indicates an inclination in x direction, and p=2 which indicates an inclination in y direction have nothing to do with the forms. Accordingly, when the coefficients $A_p$, $B_p$, and $C_p$ from p=3 to 15 are determined, approximate forms of A, B, and C are determined.

In terms of individual p values, as shown in the right end of Table 1, p=3, 8, and 15 are rotationally symmetrical and thus can be determined from the conventional simultaneous equations of a three-sheet set.

Figure 9A:
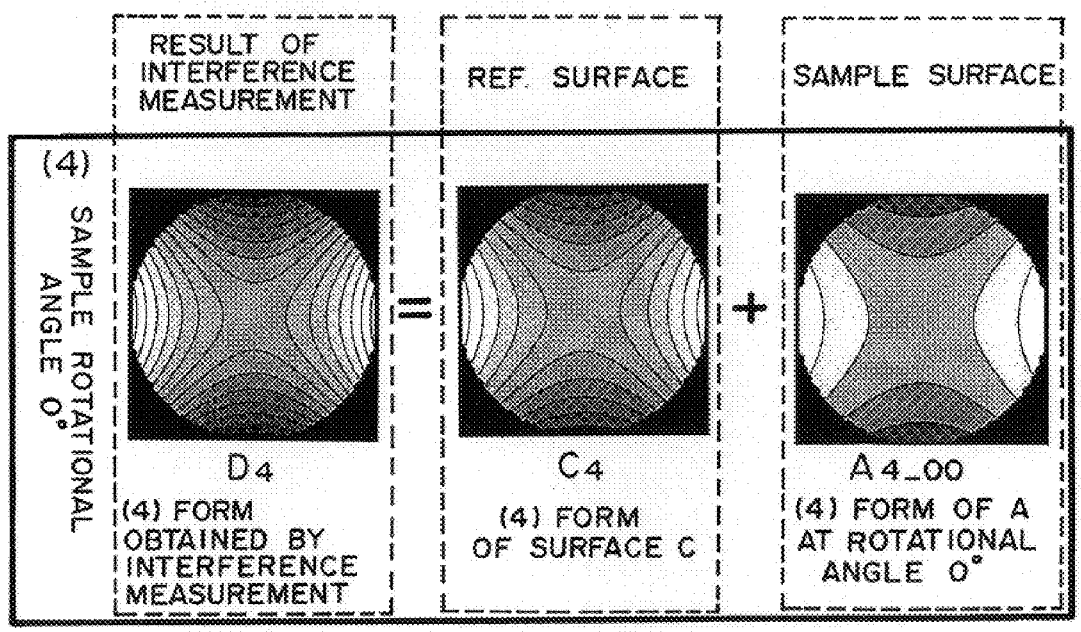
FIGS. 9A and 9B are schematic view showing an operation technique in the case where p=4 in the present example.
Figure 9B:
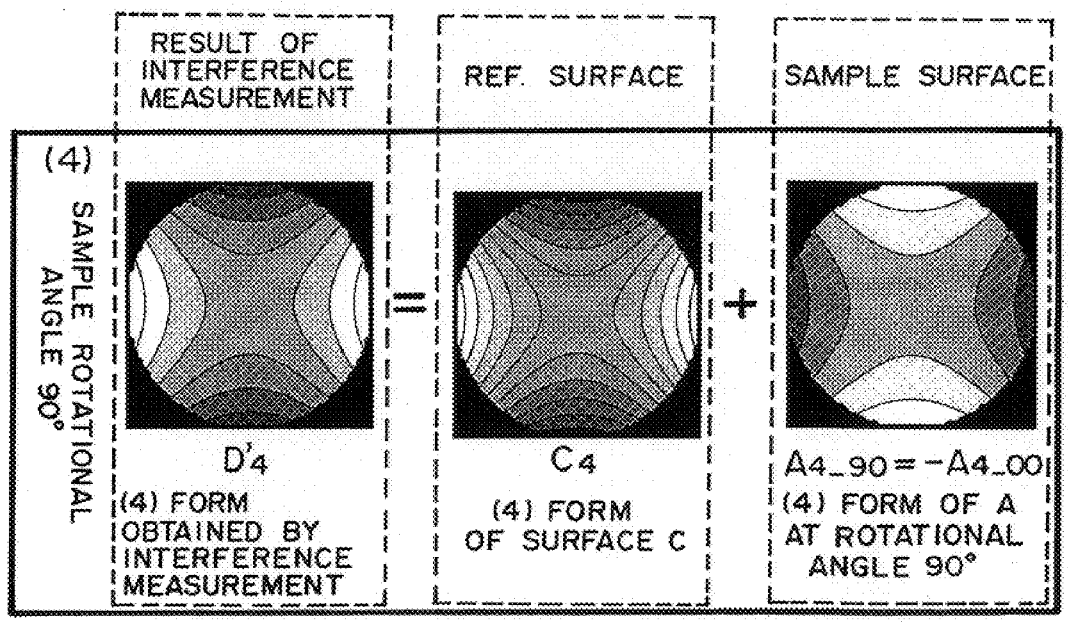

Subsequently, for example, assuming that A is rotated with respect to the optical axis by 90 degrees in order to determine other p coefficients, if it is (x, y) at 0 degree, it will become (−y, x) at 90 degrees. Accordingly, where p=4, 5, 11, and 12, if it is $A_p$ at 0 degree, it will become $-A_p$ at 90 degrees. Namely, when measurement is effected twice respectively at 0 degree and 90 degrees, and their results are added together, in expression (4), values of $A_p$ (p=4, 5, 11, and 12) are canceled by each other, thus yielding $B_p$ (p=4, 5, 11, and 12). As the values of $B_p$ are subtracted from data at 0 degree (or 90 degrees), $A_p$ (p=4, 5, 11, and 12) can be determined. FIG. 9 (9A and 9B) schematically shows an operating technique in this case. FIG. 9 (9A and 9B) typically represents a technique in the case of p=4.

Figure 10A:
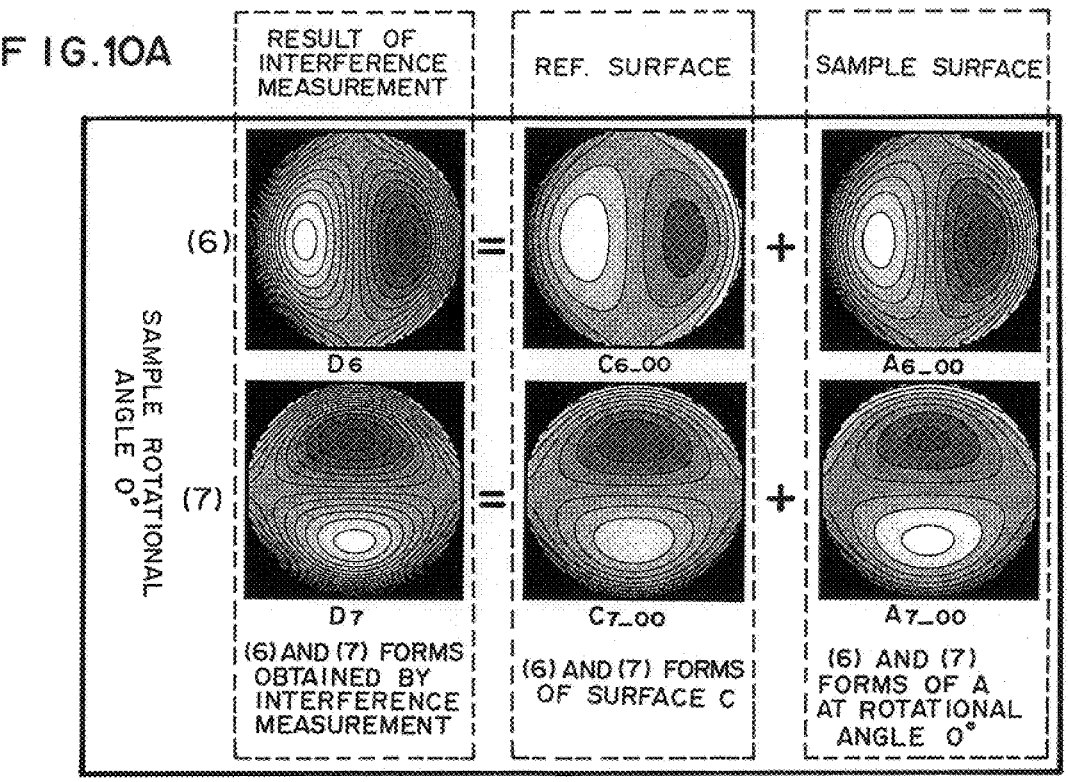

Then, as for p=6, 7, 10, 11, 13, and 14; each set of 6 and 7, 9 and 10, and 13 and 14 is considered to be a pair. For example, in A of expression (4), assuming that the coefficient of p=6 at 0 degree is $A_6$, the coefficient of p=7 becomes $A_7$. It is clear that, when rotated by 90 degrees, the coefficient of p=6 becomes $-A_7$ that is a value in which the coefficient of p=7 before rotation is changed to negative, whereas the coefficient of p=7 becomes that of p=6 before rotation, i.e., $A_6$. Accordingly, as the simultaneous equations are solved, these coefficients are determined. Similarly, from the set of p=9 and 10, and from the set of p=13 and 14, their coefficients are determined. FIG. 10 (10A and 10B) schematically shows an operation technique in this case. Here, FIG. 10 (10A and 10B) typically shows a technique in the cases of p=6 and 7.

Thus, by determining coefficients of a rotationally symmetrical form by a normal three-sheet set, and then rotating, in the three sets of measurement, the reference surface (or sample surface) of one set with respect to the sample surface (or reference surface) by 90 degrees, the remaining nonrotationally symmetrical components are determined.

Consequently obtained are, of the approximate expressions of A(x, y) and B(x, y), those adding together the coefficients of rotationally symmetrical terms, and nonrotationally symmetrical coefficients in the approximate equation of A(x, y).

Similarly, in the case of measurement where C and A are respectively set to the positions of the reference plate 5 and sample 6, obtained are, of the approximate expressions of C(x, y) and A(x, y), those adding together the coefficients of rotationally symmetrical terms. Also, as the nonrotationally symmetrical coefficients of A(x, y) determined above are subtracted from coefficients of the respective nonrotationally symmetrical terms in the approximate expressions of C(x, y) and A(x, y), the coefficients of nonrotationally symmetrical terms in the approximate equation of C(x, y) are determined. Further, in the case of measurement where B and C are respectively set to the positions of the reference plate 5 and sample 6, obtained are, of the approximate expressions of B(x, y) and C(x, y), those adding together the coefficients of rotationally symmetrical terms, and the coefficients of nonrotationally symmetrical terms in the approximate equation of B(x, y) in a manner similar to that mentioned above. Namely, Ai+Bi, Ci+Ai, Bi+Ci (i=3, 8, and 15) in which coefficients $A_j$, $B_j$, $C_j$ (j=4, 5, 6, 7, 9, 10, 11, 12, 13, and 14) of nonrotationally symmetrical terms and coefficients of rotationally symmetrical terms are added together are determined. As the simultaneous equations are solved according to thus obtained values in which rotationally symmetrical coefficients are added together, the rotationally symmetrical coefficients Ai, Bi, and Ci (i=3, 8, and 15) are determined, whereby approximate forms of the respective reference surfaces A(x, y), B(x, y), and C(x, y) are determined.

Thereafter, among the reference plates A, B, and C in which approximate forms of the reference surfaces are determined as mentioned above, the one having the highest degree of flatness is selected and set at the position of the reference plate 5 in the Fizeau interferometer shown in FIG. 7, and then an object to be measured having a sample surface to be measured is set at the position of the sample plate 6, so that the form of the sample surface is observed in terms of interference fringe.

Preferably, in this case, the form of the sample surface is determined while also taking account of the approximate form of the reference surface obtained by the foregoing method. Namely, when the approximate form is subtracted from the form measured by the interferometer, the one closer to the actual form can be obtained.

Without being restricted to the above-mentioned embodiment, the present invention can be modified in various manners. For example, though sixth-order Zernike polynomials are used as polynomials for approximating the form of the surface to be measured in the above-mentioned embodiment, various kinds of other symmetry power series polynomials may be used instead.

Further, though the surface form of the reference surface is measured by a Fizeau interferometer which measures the surface form of an actual object to be measured, various means for measuring the difference between two surfaces, which is different from the interferometer for measuring the surface form of an actual object to be measured, may be used for measuring the surface form of the reference surface.

EXAMPLE

In the following, the method of the present invention will be explained in detail with reference to a specific example.

Figure 2:
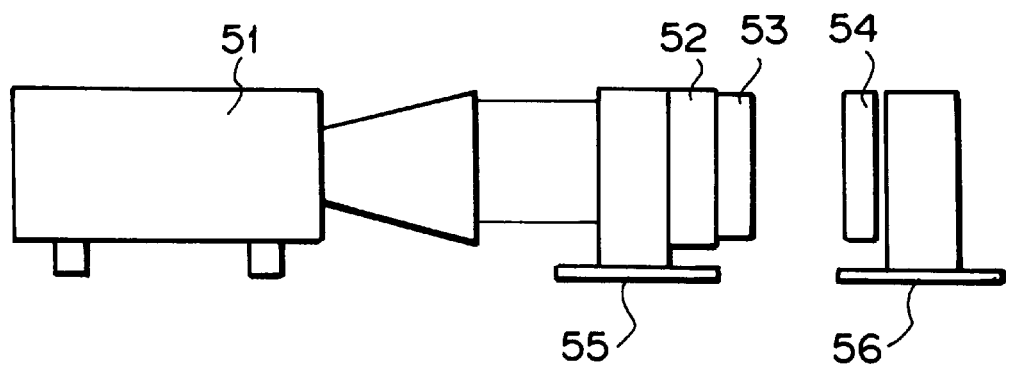
FIG. 2 is a schematic view showing an apparatus used in the example of the present invention.

The surface form of a planar glass sheet employed as a reference plate 53 of a horizontally disposed Fizeau interferometer such as that shown in FIG. 2 was measured by use of this Fizeau interferometer. Also depicted in FIG. 2 are an interferometer main body 51, a driving unit 52 for moving fringes (for fringe scanning), a sample plate 54, and five-axis adjusting tables 55 and 56.

Figure 3:
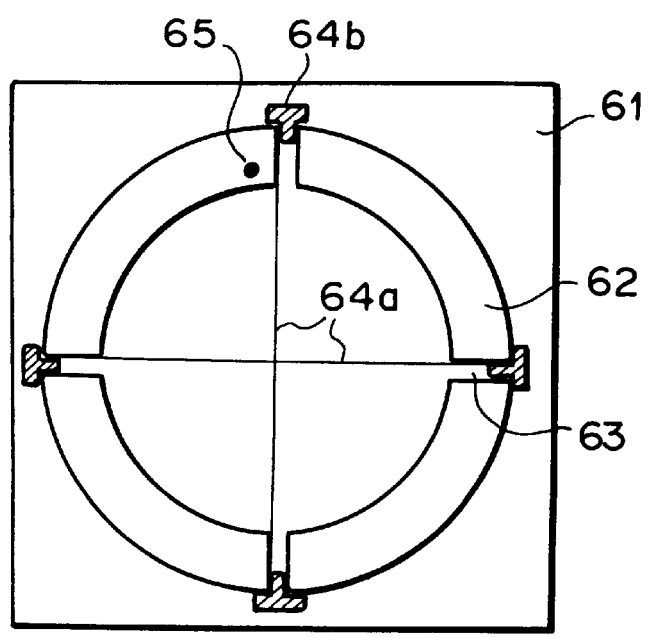
FIG. 3 is a schematic view showing members for positioning a glass sheet in its rotational direction, used in the example of the present invention.

First, three planar glass sheets A, B, and C which can become reference plates were prepared. Then, for each of them, as shown in FIG. 3, V-shaped grooves 63 were formed at 0-degree, 90-degree, 180-degree, and 270-degree positions of an annular glass holder disposed on its reference surface 61 side, and thin threads 64a were spanned over the V-shaped grooves 63 in a cross form, while each thread 64a was fastened into its corresponding V-shaped grooves with screws 64b, thus indicating the center, 0-degree, 90-degree, 180-degree, and 270-degree positions of the glass sheet. Also, as shown in FIG. 3, a mark 65 was formed in order to identify the origin.

One of thus prepared glass sheets A, B, and C arbitrarily selected was set to the five-axis adjusting table 56 as shown in FIG. 2, while one of the other glass sheets A, B, and C was set to the five-axis adjusting table 55 via the driving unit 52.

Here, the reference surfaces of thus set two glass sheets A, B, and C oppose each other. There exist six combinations in which two of the three glass sheets A, B, and C are selected so as to be respectively set to the positions of the reference plate and sample plate. For each of these combinations, the difference between thus set two reference surfaces was measured.

Namely, the combination in which the glass sheets B and A were respectively set at the reference plate and sample plate positions was defined as $A_S–B_T$; the combination in which the glass sheets C and A were respectively set at the reference plate and sample plate positions was defined as $A_S–C_T$; the combination in which the glass sheets A and B were respectively set at the reference plate and sample plate positions was defined as $B_S–A_T$; the combination in which the glass sheets C and B were respectively set at the reference plate and sample plate positions was defined as $B_S–C_T$; the combination in which the glass sheets A and C were respectively set at the reference plate and sample plate positions was defined as $C_S–A_T$; and the combination in which the glass sheets B and C were respectively set at the reference plate and sample plate positions was defined as $C_S–B_T$. For each of these combinations, the form was measured at two positions where the glass sheet set to the sample plate position was at a rotational angle of 0 degree with respect to the glass sheet set to the reference plate position and where the former glass sheet was rotated by 90 degrees with respect to the latter glass sheet. For each of these two positions, the form measurement was repeated five times.

Here, the rotational angle of 0 degree refers to a case where the positions of marks 65 in the two glass sheets are oriented in the same direction. At either rotational angle positions, the respective lines of threads in the two reference plates are set to align with each other.

Figure 4A:
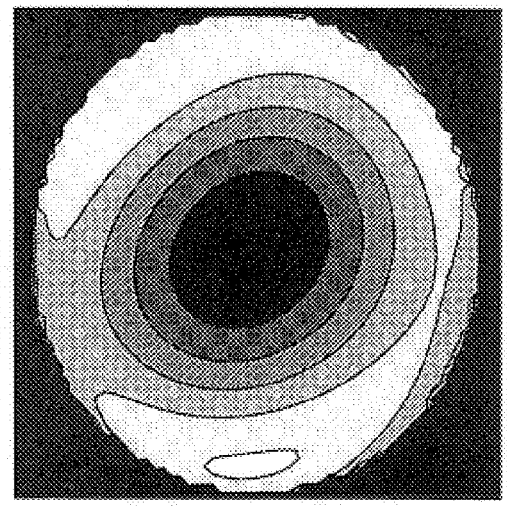
FIGS. 4A to 4C are contour maps based on results of measurement in the example of the present invention.
Figure 4B:
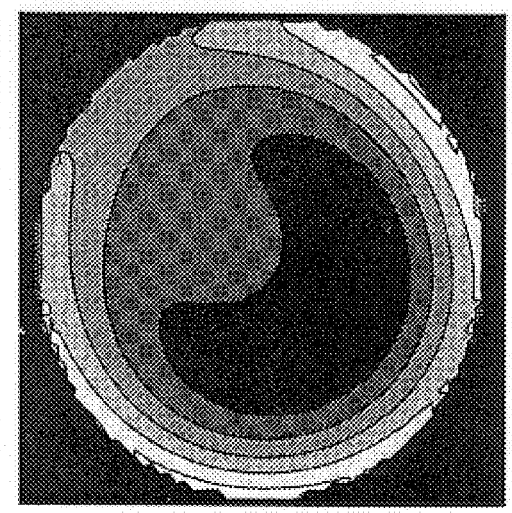
Figure 4C:
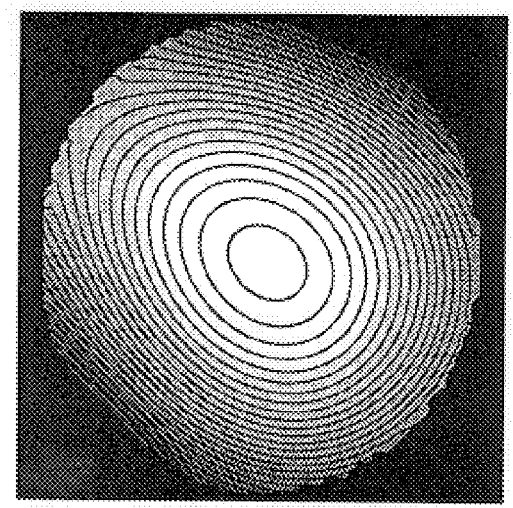

To the measured values obtained by the above-mentioned interferometer, Zernike polynomials (to the sixth term) were applied, and the above-mentioned arithmetic operation was effected. FIGS. 4A to 4C show respective contour maps of the resulting approximate forms of the glass sheets A, B, and C.

The value indicated above each drawing represents a P–V level (difference of elevation) in terms of WAVE (wavelength).

Figure 5:
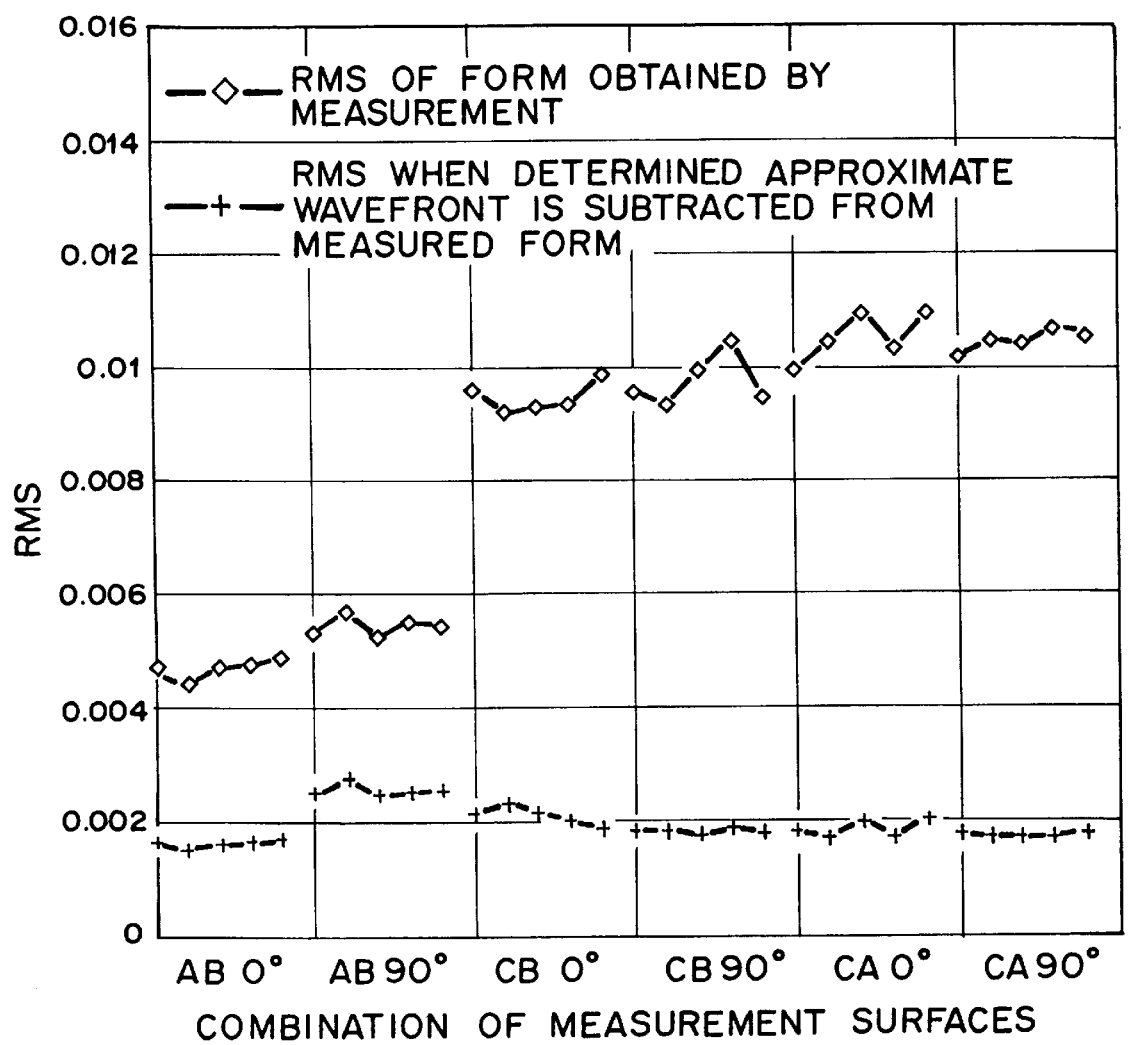
FIG. 5 is a graph showing results of measurement in the example of the present invention.

FIG. 5 is a graph showing evaluations in the case where the above-mentioned measurement is performed for each of the above-mentioned combinations. Namely, for each combination at each rotational angle position, it shows RMS (Root Mean Square) (a; indicated by "◊") of the measured form obtained by the interferometer, and RMS (b; indicated by "+") in which the measured form is approximated by the Zernike polynomials (to the sixth term) and then thus approximated form is subtracted from the measured form.

The ordinate of the graph indicates RMS level in terms of WAVE (wavelength), whereas each scale of the abscissa indicates five sets of measurement data for each angle.

Figure 6A:
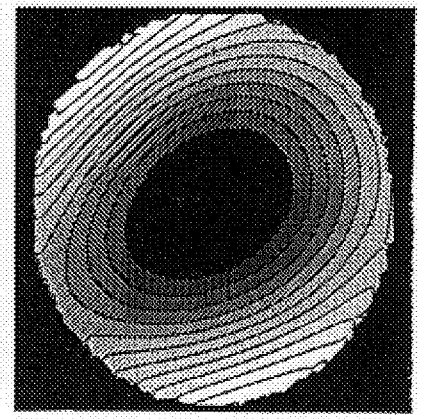
FIGS. 6A to 6C' are contour maps based on results of measurement in the example of the present invention.
Figure 6B:
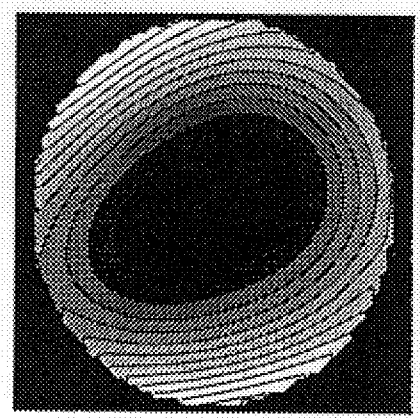
Figure 6C:
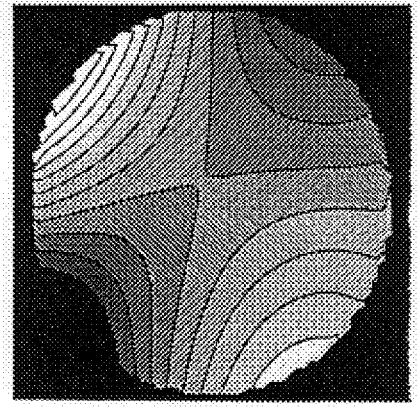
Figure 6A:
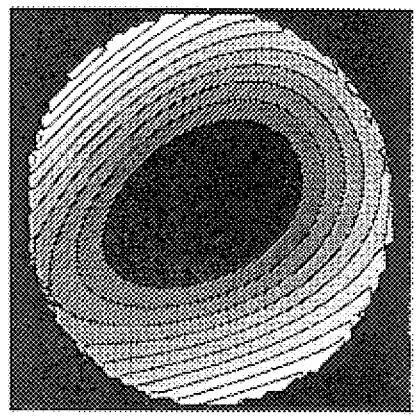
Figure 6B:
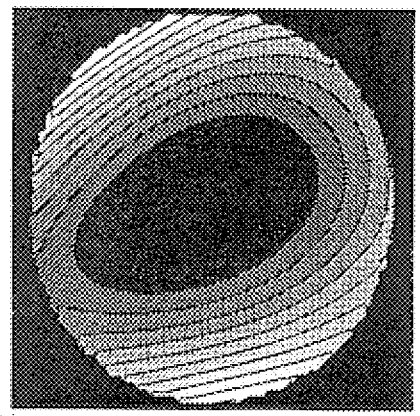
Figure 6C:
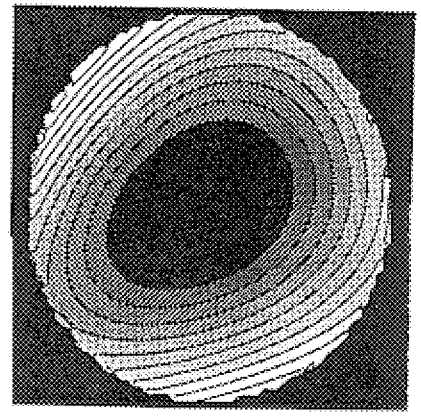

FIGS. 6A, 6B, and 6C show contour maps of the difference between opposed surfaces obtained on the basis of values in the cases where the above-mentioned glass sheets A, B, and C are respectively employed as the reference plates, while the sample surface of a sample plate D is measured by the above-mentioned Fizeau interferometer.

Namely, FIG. 6A shows the difference A+D between the reference surface of the glass sheet A and the sample surface of the sample plate D; FIG. 6B shows the difference B+D between the reference surface of the glass sheet B and the sample surface of the sample plate D; and FIG. 6C shows the difference C+D between the reference surface of the glass sheet C and the sample surface of the sample plate D.

On the other hand, FIGS. 6A', 6B', and 6C' show contour maps of forms in which the approximate forms of the reference surfaces of the corresponding glass reference plates are subtracted from the differences (A+D, B+D, C+D) respectively indicated by FIGS. 6A, 6B, and 6C.

Namely, FIG. 6A' shows the sample surface form of the sample plate D in which the reference surface form of the glass sheet A is subtracted from the above-mentioned A+D; FIG. 6B' shows the sample surface form of the sample plate D in which the reference surface form of the glass sheet B is subtracted from the above-mentioned B+D; and FIG. 6C' shows the sample surface form of the sample plate D in which the reference surface form of the glass sheet C is subtracted from the above-mentioned C+D.

As mentioned above, when the approximate form is determined by data measurement and analysis, and correction is effected on the basis thereof, a plane having a standard deviation on the order of 1 σ (=0.005 wave) can be formed.

As explained in the foregoing, in accordance with the method of measuring a highly accurate plane in accordance with the present invention, while the three-flat method is used as background art, a technique for analyzing the difference between two planes by approximating it with symmetry power series polynomials are employed, and the measurement is effected at two positions where the reference surface and the sample surface are in a predetermined reference rotation state and where they are rotated from each other by 90 degrees from the former state; whereby the approximate surface form of the whole plane can be determined by a simple arithmetic operation while reducing accumulated measurement errors.

What is claimed is:

1. A flatness measuring and analyzing method in which, of predetermined three sheets of plates, different pairs of two sheets are successively selected three times, thus selected each pair of plates are disposed so as to oppose each other with a predetermined gap therebetween upon each selecting operation, a difference between those opposed surfaces to be measured is two-dimensionally measured, and a form of the surface to be measured of each of the plates is determined by operating results of the three sets of measurement, said method comprising the steps of:

measuring the difference between a pair of surfaces to be measured at a first position where, with respect to one plate, the other plate is set at a predetermined rotational position and at a second position where the two plates are rotated from each other by 90° from the first position;

subsequently preparing a relational expression correlating results of measurement of the difference between the opposed surfaces at the first and second positions with predetermined symmetry power series polynomials approximating a form of the surface of the plate to be measured;

then determining the form of the surface to be measured in each of the plates by operating the relational expressions prepared for the respective surfaces to be measured in each of the pairs with each other;

wherein said symmetry power series polynomials include a rotationally symmetrical term and a nonrotationally symmetrical term; and wherein, included as said nonrotationally symmetrical term is a term in which, when a coordinate axis is rotated by 90 degrees, only a sign of a coefficient is reversed with respect to the expression before rotation; and wherein said symmetry power series polynomials include a rotationally symmetrical term and a nonrotationally symmetrical term; and wherein, included as said nonrotationally symmetrical term is a term in which, when a coordinate axis is rotated by 90 degrees, of two nonrotationally symmetrical terms which form a pair, the expression before rotation of one term and the expression after rotation of the other term exchange coefficients thereof or reverse signs of coefficients thereof.

2. A flatness measuring and analyzing method according to claim 1, wherein said symmetry power series polynomials comprise a rotationally symmetrical term and a nonrotationally symmetrical term; and wherein said nonrotationally symmetrical term consists of a term in which, when a coordinate axis is rotated by 90 degrees, only a sign of a coefficient is reversed with respect to the expression before rotation, and a term in which, when the coordinate axis is rotated by 90 degrees, of two nonrotationally symmetrical terms which form a pair, the expression before rotation of one term and the expression after rotation of the other term exchange coefficients thereof or reverse signs of coefficients thereof.

3. A flatness measuring and analyzing method according to claim 1, wherein said predetermined symmetry power series polynomials are sixth-order Zernike polynomials.

4. A flatness measuring and analyzing method according to claim 1, wherein a Fizeau interferometer is used for two-dimensionally measuring said difference between the opposed surfaces.

* * * * *